(No Model.)
J. HOWARD.
CAR BRAKE ADJUSTER.
No. 538,418. Patented Apr. 30, 1895.
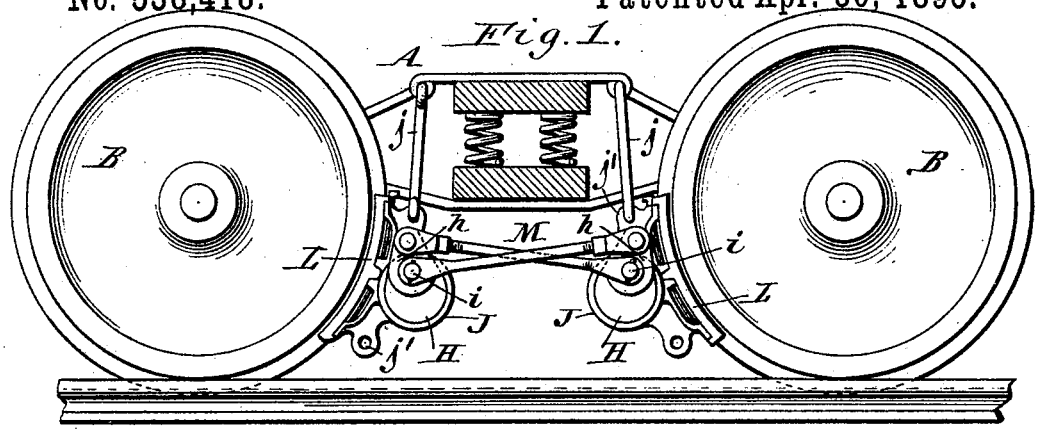
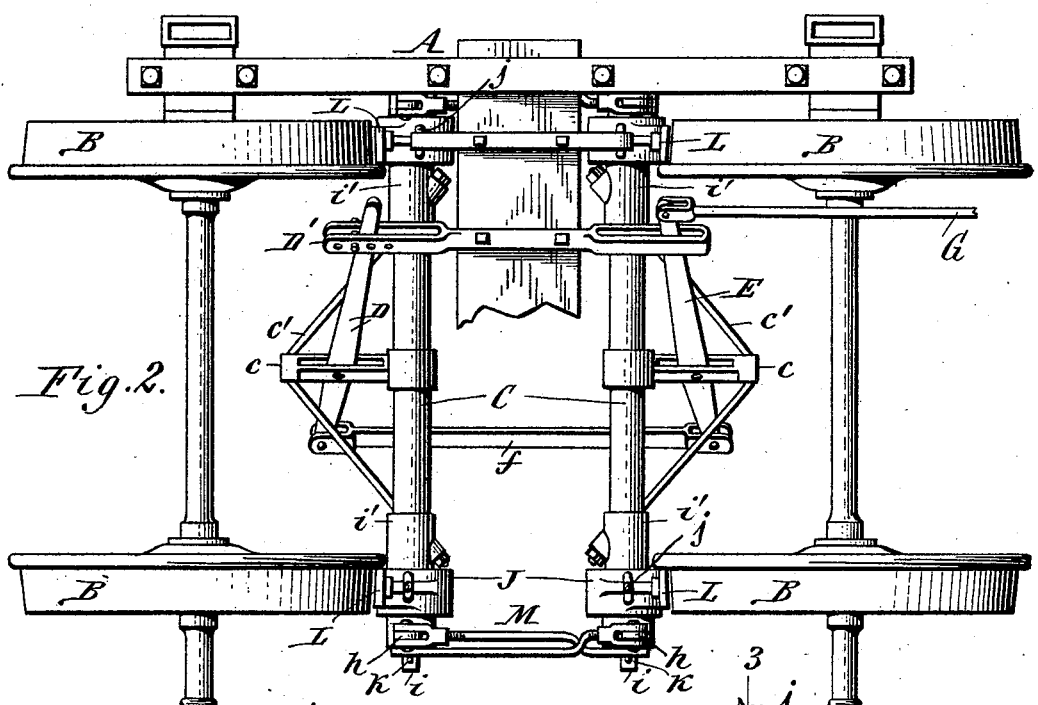
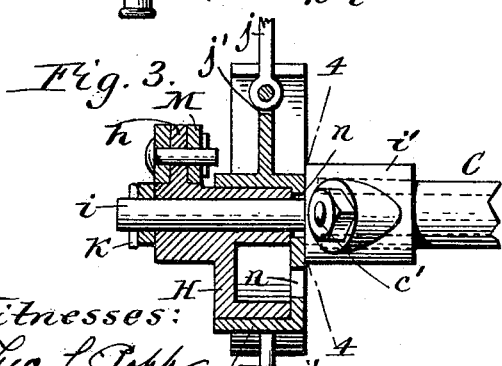
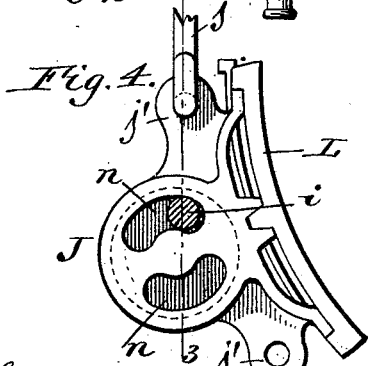
Witnesses:
Theo. L. Popp.
F. Gustav. Wilhelm
James Howard Inventor
By Wilhelm Bonner Attorneys

UNITED STATES PATENT OFFICE.

JAMES HOWARD, OF NEW YORK, N. Y.

CAR-BRAKE ADJUSTER.

SPECIFICATION forming part of Letters Patent No. 538,418, dated April 30, 1895.

Application filed March 2, 1895. Serial No. 540,340. (No model.)

*To all whom it may concern:*

Be it known that I, JAMES HOWARD, a citizen of the United States, residing at New York, in the county and State of New York, have invented new and useful Improvements in Car-Brake Adjusters, of which the following is a specification.

This invention relates to automatic car brake adjusters and more especially to an adjuster of this character in which the slack and wear are taken up by an eccentric connected with the brake gearing. A car brake adjuster of this kind is shown and described in an application for patent filed by me February 27, 1894, Serial No. 501,638.

The objects of my present improvement are to render the adjusting mechanism universally applicable as well as more simple and compact, and to more securely hold the parts in their proper relative positions.

In the accompanying drawings, Figure 1 is a sectional side elevation of a car-truck provided with my improved brake-adjuster. Fig. 2 is a top plan view thereof, with a portion of the truck-body broken away. Fig. 3 is a cross-section of one of the brake-heads on an enlarged scale, the section being taken in line 3 3, Fig. 4. Fig. 4 is a vertical section in line 4 4, Fig. 3.

Like letters of reference refer to like parts in the several figures.

A, represents the body or frame of the car-truck and B the wheels.

C, represents the brake beams which may be provided with a central strut $c$ and a longitudinal truss rod $c'$ passing over said strut.

D, is the dead brake lever which is pivoted near its lower end to the strut $c$ of one of the brake beams and pivotally connected at its upper portion to the usual forked bar $D'$ secured to the truck body A, as shown in the drawings.

E, is the live brake lever pivoted near its lower end to the strut of the other brake beam and having its lower arm connected with the lower arm of the dead brake lever by a rod $f$.

G, is the pull rod which connects the upper end of the live brake lever with the hand and air brake mechanism, whereby the brakes are applied. This brake mechanism is not shown in the drawings and may be of any ordinary construction.

H, represents eccentric disks arranged to turn on the end portions of the brake beams. These eccentrics are preferably mounted on horizontal journals or reduced portions $i$ of the brake beam which are arranged on the ends of the brake beams. In the construction shown in the drawings, these journals are carried by sleeves $i'$ applied to the ends of the brake beams and secured thereto by the truss rod $c'$ which passes through the beam and the sleeves. Each eccentric disk is provided with a radial actuating arm $h$.

J represents brake heads which are suspended from the truck body by hangers $j$, in the usual way and which are mounted on the peripheries of the eccentric disks, the brake heads being formed with circular openings or sockets which receive the rotary eccentric disks, as most clearly shown in Fig. 3. Each eccentric disk is retained upon its journal by a pin $k$ passing through the journal on the outer side of the disk. The brake head bears against the shoulder at the inner end of the journal $i$ and the disk bears against the bottom of the socket in the brake head, thus retaining the latter upon the brake beam.

L represents the brake shoes which are detachably secured to the brake heads by any suitable or well known fastening, and which bear against the adjacent inner side of the car wheels.

M represents shifting rods whereby the eccentric disks are turned on the brake beams for moving the brake heads and shoes toward the wheels. Each of the eccentric disks is provided with such a shifting rod, and one end of the rod is pivoted to the actuating arm $h$ of one disk, while its opposite end is attached to the adjacent end or journal of the brake beam supporting the opposing disk preferably on the outer sides of the disk, as shown. The shifting rods of the two eccentric disks on the same side of the car truck cross each other and in order to prevent interference thereof they are bent or offset where they cross, as shown in Figs. 1 and 2. One of the heads or end portions of each shifting rod is preferably made longitudinally adjustable on the body of the rod by a screw threaded joint, as shown, or by any other suitable means, to permit the rods to be readily adjusted and facilitate their attachment to the adjuster.

Upon applying the brakes when the shoes are unworn both brake beams are moved toward the wheels and the shoes are forced against the wheels. When the brake shoes become worn, the brake beams and connecting parts are moved forward a correspondingly greater distance by the usual air cylinder and piston for causing the shoes to bear against the wheel. As the shifting rods of the eccentric disks of each brake beam are connected with the other brake beam, this increased forward movement of the brake beams causes the shifting rods to be drawn forward with the beams, thereby pulling the radial actuating arms of the opposing eccentric disks toward each other and causing the same to turn the disks in the proper direction to move the brake heads and shoes toward the wheels, thus compensating for the wear of the shoes.

In the normal unworn condition of the brake shoes the eccentric disks by reason of their connection with the shifting rods are caused to oscillate in the sockets of the brake heads in following the forward and backward movements of the brake beams, the extent of this oscillation being determined by the extent of vibration of the shoe in being applied and released.

Each brake head is provided in the bottom or inner end of its socket with two curved slots $n$ through one of which the adjacent journal passes and which permits the necessary play of the eccentric disk and the brake head.

If desired, the brake heads may be provided with a single slot but they are preferably formed with two slots arranged on opposite sides of the center of the sockets, as shown in the drawings, as this construction enables the heads to be reversed and applied to either of the brake beams and on either side of the truck thus avoiding the necessity of making the heads "rights" and "lefts." For this purpose the hanger eyes $j'$ are also duplicated at the bottom of the heads. This construction also enables the position of the shifting rods M and of the eccentrics to be reversed, so as to operate the eccentrics on their under sides instead of on their upper sides which arrangement is often advantageous.

The shifting rods M while serving to turn the eccentric disks for taking up wear, also form a connection between the two brake beams, whereby the parts are reliably held in their proper relative positions.

I do not wish to claim broadly in this application the eccentric adjusting disks, as that feature is claimed in my prior application for patent, Serial No. 501,638, hereinbefore referred to.

I claim as my invention—

1. The combination with the opposing brake beams and the brake shoes, of a rotary eccentric disk for adjusting the brake shoes connected with one of said beams and an actuating rod connected at one end with said eccentric and its opposite end connected directly with the other brake beam, substantially as set forth.

2. The combination with the opposing brake beams and the brake shoes, of rotary eccentric disks mounted on the end portions of said brake beams and shifting rods for said eccentric disks, each connected at one end with one of said eccentric disks and at its opposite end with the brake beam carrying the opposing disk, substantially as set forth.

3. The combination with the opposing brake beams, of rotary eccentric disks mounted on the brake beams and each having an actuating arm, brake heads arranged on said eccentric disks and carrying the brake shoes, and crossed shifting rods, each connected at one end with the actuating arm of one of the eccentric disks and at its opposite end with the brake beam carrying the other eccentric disk, substantially as set forth.

4. In a car brake adjuster, the combination with the brake beam and an eccentric disk mounted thereon, of a brake head having a cylindrical socket which surrounds said eccentric disk and which is provided in its bottom with slots for the passage of the brake beam arranged on opposite sides of the center of the socket, substantially as set forth.

5. The combination with the brake beam having a reduced end portion or journal forming a shoulder, of a brake head bearing against said shoulder and having a circular socket, an eccentric disk arranged in said socket and mounted on the journal of the brake beam, and means for retaining the eccentric disk upon said journal, substantially as set forth.

Witness my hand this 21st day of February, 1895.

JAMES HOWARD.

Witnesses:
JNO. J. BONNER,
E. R. DEAN.